Oct. 19, 1948.   W. P. OEHLER   2,451,690
TWO-PART SPROCKET
Filed May 12, 1945
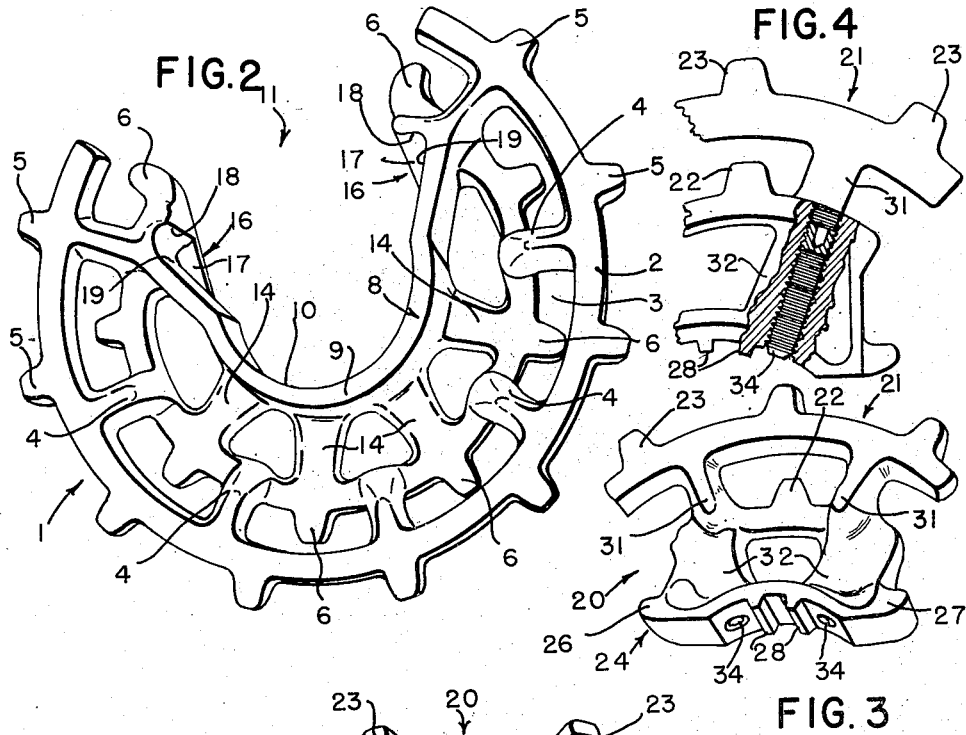
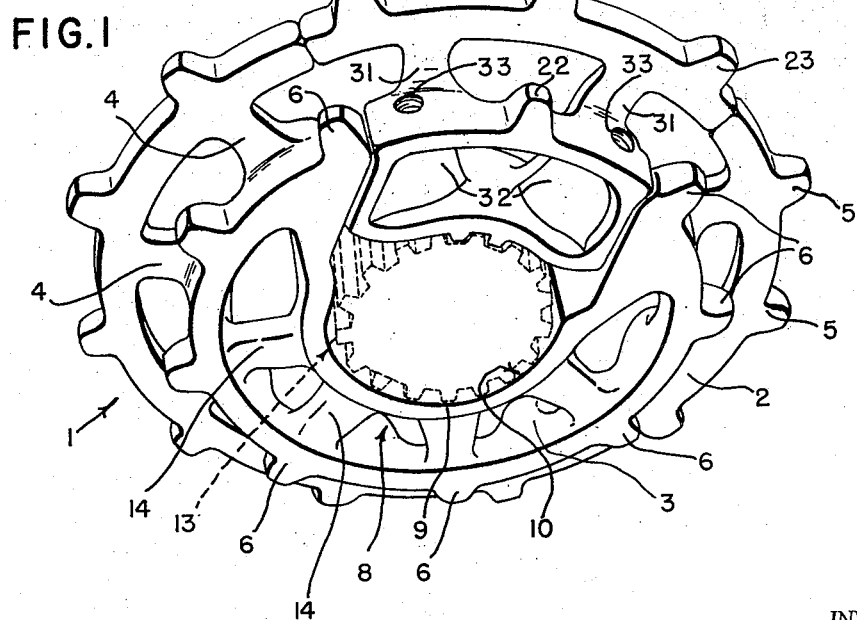
INVENTOR.
WILLIAM P. OEHLER
BY Patented Oct. 19, 1948

2,451,690

UNITED STATES PATENT OFFICE 2,451,690

TWO-PART SPROCKET

William P. Oehler, Moline, Ill., assignor to Deere & Company, Moline, Ill., a corporation of Illinois Application May 12, 1945, Serial No. 593,403

10 Claims. (Cl. 74—243)

The present invention relates generally to agricultural machines and more particularly to implements of the type that are adapted to be mounted on a farm tractor or the like wherein the implement includes a part that is adapted to be driven, for example, from the tractor axle shaft.

The object and general nature of the present invention is the provision of a new and improved form of detachable sprocket that is adapted to be mounted on an axle shaft without removing the tractor wheel or other parts therefrom. More specifically, it is a feature of this invention to provide a new and simplified detachable sprocket section which, in general, comprises only two parts adapted to be assembled about the axle shaft or other support and to be interlocked one with the other, with a simple clamping means, preferably acting directly against the shaft, for rigidly and positively holding the sprocket parts assembled about the shaft or other support upon which they are mounted. A further feature of this invention is a provision of a detachable sprocket which provides integral interlocking sockets and lugs with which cooperating set screw means serve not only to hold the sprocket parts together but also to clamp them to the axle shaft or other support, thereby eliminating all attaching and connecting bolts, lock washers and the like which heretofore have been considered necessary.

These and other objects and advantages of the present invention will be apparent to those skilled in the art after a consideration of the following detailed description, taken in conjunction with the accompanying drawings in which one preferred embodiment of the invention has been shown by way of illustration.

In the drawings:

Figure 1 is a perspective view of the preferred form of detachable two-part double sprocket in which the principles of the present invention have been incorporated, showing the same as mounted on the axle shaft of a farm tractor for the purpose of deriving power therefrom for driving implement parts or the like.

Figure 2 is a perspective view taken from the other side of the sprocket unit, showing the larger part of the two parts making up the sprocket unit.

Figure 3 is a similar perspective view showing the other part of the two sprocket parts.

Figure 4 is a fragmentary view showing the set screw arrangement for clamping the sprocket onto a shaft or the like.

The major part of the two parts making up the sprocket unit is indicated in its entirety by the reference numeral 1. The member 1 comprises a pair of toothed rim portions 2 and 3, the latter being of smaller diameter than the former, connected together by a plurality of curved spoke sections 4. The larger peripheral section 2 is provided with teeth 5 and a smaller peripheral rim section 3 is provided with sprocket teeth 6. The member 1 also includes a hub section 8 which is flanged, as at 9, providing a generally central opening 10 which is open at one side, as at 11, whereby the other sprocket part 1 may be placed about a member, such as the axle shaft 13 of a farm tractor or the like. The hub section 8 is connected with the toothed rim portions by generally radial spokes 14. The open space 11 serves to interrupt the toothed rim portions, which otherwise would be completely circular, and at each side of the opening 10 is a socket section 16. Each socket 16 has a bottom wall 17, forming a closed side of the socket, an end wall 18 forming an overhanging lug portion, and a side wall 19 which is formed generally as a continuation of a flanged portion 9.

The other sprocket part is indicated in its entirety by the reference numeral 20 and comprises, in general, a part that is complementary with respect to sprocket part 1 so that the two, taken together, form a circular sprocket member. The member 20 is provided with an arcuate rim section 21 having two sets of teeth 22 and 23 thereon, and a hub section 24 which is of the same axial length as the flange 9 of the hub 8 on the sprocket member 1. The hub section 24, as best shown in Figure 3, is provided with a pair of lugs 26 and 27 thereon and, centrally thereof, is provided with a pair of ribs 28. The lugs 26 and 27 are adapted to seat in the sockets 16 when the sprocket parts are assembled in position about a shaft or other member to which a sprocket unit is to be attached. As shown, the sprocket is designed for attachment to a splined member, and the ribs 28 are adapted to fit in between the splines of the shaft 13. When thus assembled, as best shown in Figure 1, the rim section 21 forms a continuation of and completes the rim section 2 of the sprocket member 1, and likewise the smaller rim portion 22 of the member 20 forms a continuation of and completes the rim section 3 on the member 1. The sprocket member 20 has curved spoke portions 31 which connect the two rim sections 21 and 22, and the sprocket member 20 has a pair of radial spoke portions 32 which are somewhat heavier than the radial spokes 14 of the sprocket member 1. This provides sufficient stock to accommodate the formation of a pair of tapped generally radially extending holes 33 which open interiorly on opposite sides of the ribs 28. The holes 33 are tapped to receive headless set screws 34 which, by use of a socket wrench or the like, may be screwed radially inwardly so as to bear against the shaft 13 and which when tightened serves to force the lugs 26 and 27 generally radially outwardly into firm clamping contact with the sockets 16, thus holding both members 1 and 20 of the sprocket unit firmly and rigidly on the shaft 13. At the same time, the ribs 28 form a firm driving connection between the shaft 13 and the sprocket unit.

The sprocket unit is assembled on the shaft 13 or some other support by passing the sprocket member 1 into position about the shaft and then bringing the sprocket part 20 alongside the open end 11 until the ribs seat between the splines of the shaft 13. Then the member 20 is shifted axially a small distance sufficient to bring the lugs 26 and 27 into seating engagement in the sockets 16, preferably up against the walls 17 thereof. Tightening the set screws 34 then completes the mounting and assembly of the sprocket. It will be noted, also, that the sprocket as a whole may be shifted laterally along the shaft 13, as, for example, to bring either the larger sprocket section or the smaller sprocket section into line with the driven sprocket, merely by loosening the set screws 34 and shifting the sprocket unit the necessary distance axially along the shaft 13.

While I have shown and described above the preferred structure in which the principles of the present invention have been incorporated, it is to be understood my invention is not to be limited, to the particular details shown and described above, but that, in fact, widely different means may be employed in the practice of the broader aspects of my invention.

What I claim, therefore, and desire to secure by Letters Patent is:

1. In an agricultural implement, a two-part sprocket adapted to be attached to the axle of a tractor, comprising a pair of complementary sprocket parts adapted to be assembled about said axle, one of said parts having spaced socket sections, adapted to permit said axle to pass therebetween, and the other sprocket part having lugs adapted to seat in said sockets, and fastening means carried by one of said sprocket parts and adapted to react against said axle for clamping said lugs in said sockets and thus holding said sprocket parts in assembled relation on said axle.

2. A two-part sprocket construction adapted to be assembled about a shaft, comprising a pair of complementary parts, one having a generally central shaft-receiving opening, open at one side to receive said shaft, said one part having a pair of spaced sockets, one at each side of said opening, a pair of lugs formed on the other sprocket part and adapted to be disposed, respectively, in said sockets when said parts are assembled about said shaft, and means for holding said sprocket parts together.

3. A two-part sprocket construction adapted to be assembled about a shaft, comprising a pair of complementary parts, one having a generally central shaft-receiving opening, open at one side to receive said shaft, said one part having a pair of spaced sockets, one at each side of said opening, a pair of lugs formed on the other sprocket part and adapted to be disposed, respectively, in said sockets when said parts are assembled about said shaft, and means for fastening said sprocket parts together and holding them in fixed relation on said axle, comprising set screw means carried by other sprocket part and adapted to be screwed into contact with said axle, reacting against said other sprocket part and acting through said lugs and sockets for clamping said one sprocket part against said axle.

4. A two-part sprocket construction adapted to be assembled about a shaft, comprising a pair of complementary parts, one having a generally central shaft-receiving opening, open at one side to receive said shaft, said one part having a pair of spaced sockets, one at each side of said opening, a pair of lugs formed on the other sprocket part and adapted to be disposed, respectively, in said sockets when said parts are assembled about said shaft, and a pair of set screws having adjustable threaded connection with said other sprocket part and adapted to be turned radially inwardly against said axle for holding said sprocket parts clamped thereto.

5. A two-part sprocket comprising a pair of complementary sprocket members adapted to be assembled about a shaft, cooperating interengaging means formed on said sprocket members and adapted to be brought into interengaging relation by an axial movement of one sprocket part relative to the other and, when engaged, being adapted to resist relative displacement in a generally radial direction, and means for holding said sprocket parts in engagement.

6. In a two-part sprocket construction, a sprocket member having a generally central opening open at one side to accommodate insertion of the sprocket member onto a shaft or the like, a lug-receiving socket formed at each side of said opening, said sockets including overhanging portions extended generally toward one another and lying in the general plane of the sprocket, and a second sprocket member having a complementary portion disposed in said central opening to complete the same and including laterally outwardly directed lugs adapted to engage under the overhanging portions of said sockets.

7. A two-part double sprocket construction comprising a two-part sprocket construction comprising a pair of complementary sprocket members, one of said members having a generally central opening open at one side and provided with a pair of sockets, one at each side of said opening, the other sprocket member having a pair of lugs adapted to seat in said sockets and, generally centrally therebetween, a spline-engaging rib on said other sprocket member, whereby said sprocket members are adapted to be mounted on a spline shaft or the like, said other sprocket member having a pair of tapped openings formed therein and extending generally radially, emerging from the radially inner side of said other sprocket member on opposite sides of said rib, and clamping means in the form of a pair of threaded parts screwed into said tapped openings and adapted to bear generally radially against the shaft about which said sprocket members are mounted for holding said lugs in said sockets and said sprocket members fixed rigidly to said shaft.

8. The invention set forth in claim 7, further characterized by said sprocket members having sprocket sections of different diameters, said tapped openings being disposed generally in a radial plane passing between said sprocket sections.

9. A two-part sprocket construction adapted to be assembled about a shaft, comprising a pair of complementary parts, one having a generally central shaft-receiving opening, open at one side to receive said shaft, said one part having a pair of spaced sockets, one at each side of said opening, a pair of lugs formed on the other sprocket part and adapted to be disposed, respectively, in said sockets when said parts are assembled about said shaft, and means on said other sprocket part and acting against said shaft for holding said sprocket parts in position on said shaft.

10. A two-part sprocket construction adapted to be assembled about a shaft, comprising a pair of complementary parts, one constructed to encircle the shaft more than the other part, one part having sockets facing one another and the other part having lugs adapted to seat in said sockets and extending generally in opposite directions, said sockets being open in a generally axial direction to provide for assembling said parts about said shaft and interengaging one part with the other by an axial movement.

WILLIAM P. OEHLER.

REFERENCES CITED

The following references are of record in the file of this patent:

UNITED STATES PATENTS

| Number | Name | Date |
| --- | --- | --- |
| 464,154 | Guthrie | Dec. 1, 1891 |
| 969,148 | Downs | Aug. 30, 1910 |
| 1,431,374 | Cullman | Oct. 10, 1922 |
| 2,382,740 | Noffsinger | Aug. 14, 1945 |